UNITED STATES PATENT OFFICE.

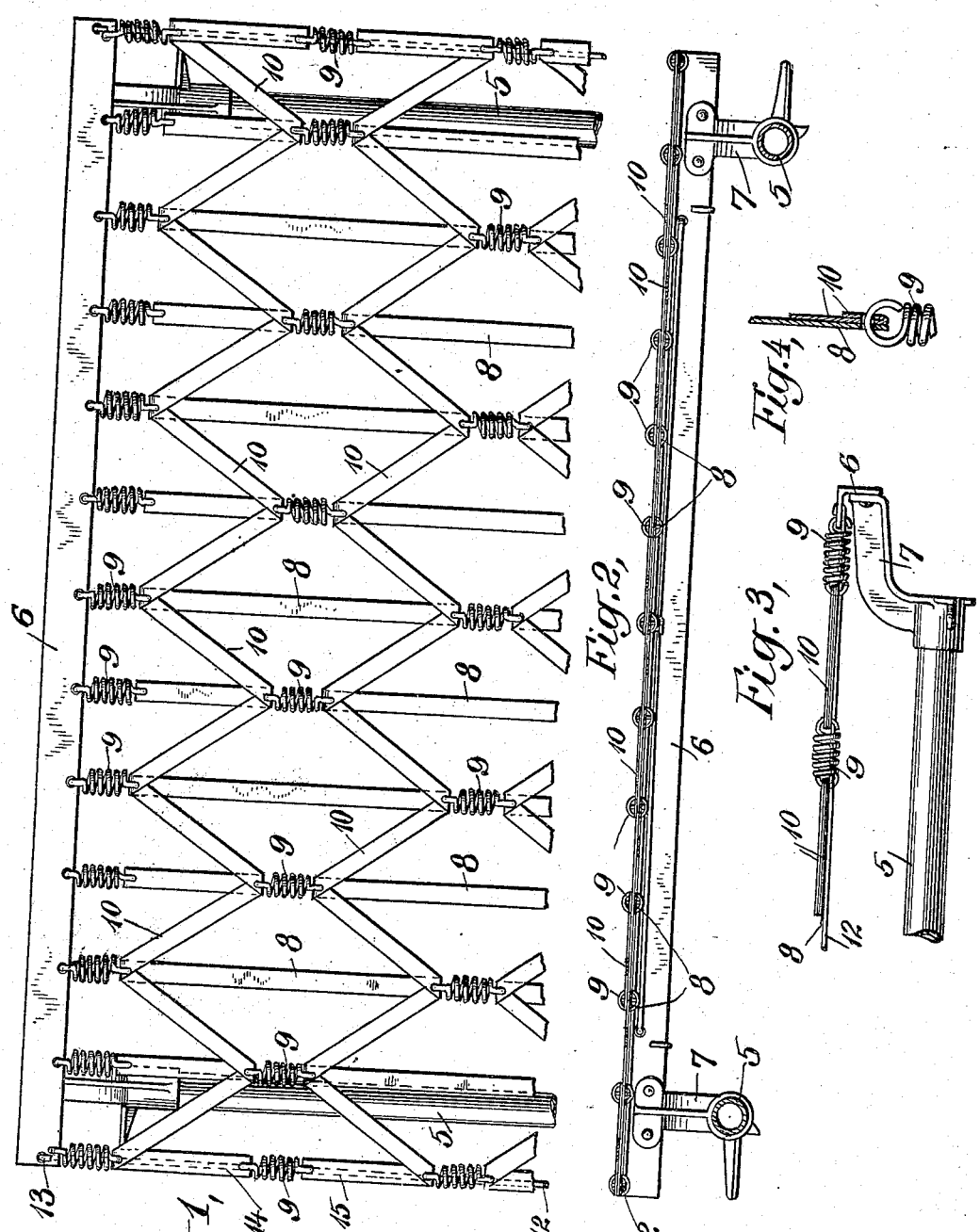

HENRY E. GATES, OF NEWARK, NEW JERSEY.

SPRING FABRIC.

941,447.

Specification of Letters Patent. Patented Nov. 30, 1909.

Application filed March 11, 1909. Serial No. 482,702.

*To all whom it may concern:*

Be it known that I, HENRY E. GATES, a citizen of the United States of America, and a resident of Newark, county of Essex, and State of New Jersey, have invented certain new and useful Improvements in Spring Fabric, of which the following is a specification, reference being had to the accompanying drawings, forming a part thereof.

My invention relates to improvements in spring fabric of the type employed in bedsteads, couches, and the like, and consists in a novel construction and arrangement of parts comprising a plurality of rows of longitudinal connecting links, the said links being arranged in staggered relation to each other in adjacent rows, springs for connecting the links of each row together, and diagonal links for connecting the opposite ends of the adjacent longitudinal links in contiguous rows together.

My invention also consists in certain further details of construction and combinations of parts, as will hereinafter be more fully set forth.

The object of my invention is to distribute strain applied at any one point in the fabric over as large an area as possible, to promote flexibility without sacrificing strength, to increase the durability of the structure, and to reduce the cost of manufacture as far as possible.

In order that my invention may be thoroughly understood, I will now proceed to describe an embodiment thereof having reference to the accompanying drawings illustrating the same, and will then point out the novel features in claims.

In the drawings: Figure 1 is a face view of a section of spring fabric embodying my invention. Fig. 2 is a view in transverse section therethrough. Fig. 3 is a view in side elevation of a portion thereof. Fig. 4 is a detail view showing the construction of certain of the diagonal links employed.

The supporting member for the fabric may conveniently comprise the usual side rods 5 and end bars 6 (only one of the latter being shown in the drawings), the said side rods being connected to the end bars by means of socket members 7. The fabric itself is composed of a plurality of rows of longitudinal connected links, a plurality of short sections of helical springs 9 which connect the said links together, and a plurality of diagonally disposed connecting links 10 which connect the opposite ends of the adjacent longitudinal links in contiguous rows together. The said adjacent links in contiguous rows overlap each other,—that is to say, the longitudinal links are of greater lengths than the distance between the links in adjacent rows, so that the diagonal links which connect the opposite ends of the adjacent links in contiguous rows together form acute angles with respect to such links. The ends of the springs 9 preferably engage perforations in the ends of the diagonal links as well as in the ends of the longitudinal links, such engagement forming the means by which the longitudinal and diagonal links are connected together. The arrangement of the diagonal links is such that they form a plurality of horizontal rows, as will be well understood by reference to Fig. 1 of the drawings, and all the links of any one row may be conveniently formed integrally, such, for instance, as by bending a strip of material backward and forward upon itself at points distant apart the length of the individual links to be employed. By this means a certain lateral rigidity is imparted to the structure which would not otherwise be present if the several links in any one row were separate from each other. Because of the staggered relation of the longitudinal links 8 it will follow from the foregoing description that the springs which connect the ends of the said links together are also in staggered relation, but a full set of such springs, that is, one for each longitudinal row, are arranged in a horizontal row at the end of the fabric, such springs being connected at one end to the end bar 6.

I may, if desired, provide a longitudinal tie rod 12 upon the opposite sides of the fabric for bracing the structure at these points. This tie rod may be conveniently disposed immediately beneath the longitudinal connecting links 8 at the edge of the fabric and through the springs 9 in line therewith, the ends of the said rod being hooked through an aperture in the end bars as at 13. I may also, if desired, employ an extra set of springs at the edge of the fabric, the longitudinal connecting links 8 being divided into two members 14—15 for such purpose and the extra springs being employed to connect the two said members together. The links, both longitudinal and diagonal, are preferably of flat form, being conveniently constructed of thin metal tape as shown.

It will readily be seen that when strain is applied to any particular point in a spring fabric constructed in the manner herein shown and described such strain will be distributed over a considerable area, for whenever such strain be applied in the line of any set of longitudinal links, such strain will not only be taken up in that line but will also be taken up all through the various diagonal links and the various springs connecting them at different points. The number of springs employed at different points and the relationship of the diagonal links to the longitudinal links is such as to insure great flexibility. The flat form of the links forms a good support for a mattress, cushion or other pad to be carried thereby while, as is well known, material in such form is very inexpensive and easy to handle in manufacture.

What I claim is:

1. The combination with a plurality of rows of longitudinally disposed connecting links, the said links being arranged in staggered relation to each other in adjacent rows, and springs connecting the links of each row together, of diagonal links which connect the opposite ends of the adjacent longitudinal links in contiguous rows together.

2. The combination with a plurality of rows of longitudinally disposed connecting links, the said links being arranged in staggered relation to each other in adjacent rows, and springs connecting the links of each row together, of diagonal links which connect the opposite ends of the adjacent longitudinal links in contiguous rows together, the said diagonal links forming acute angles with the longitudinal links which they connect.

3. The combination with a plurality of rows of longitudinally disposed connecting links, the said links being arranged in staggered relation to each other in adjacent rows, and springs connecting the links of each row together, of a plurality of horizontal rows of diagonal links which connect the opposite ends of the adjacent longitudinal links in contiguous rows together, the diagonal links of the said horizontal rows being rigidly connected together.

4. The combination with a plurality of rows of longitudinally disposed connecting links, the said links being arranged in staggered relation to each other in adjacent rows, and springs connecting the links of each row together, of a plurality of horizontal rows of diagonal links which connect the opposite ends of the adjacent longitudinal links in contiguous rows together, the diagonal links of the said horizontal rows being formed of a single integral strip.

HENRY E. GATES.

Witnesses:
K. L. DISCH,
WILFRID A. MANCHEL.